(12) United States Patent
Todoroki

(10) Patent No.: US 12,073,645 B2
(45) Date of Patent: Aug. 27, 2024

(54) INFORMATION PROCESSING APPARATUS, INFORMATION PROCESSING SYSTEM, AND NON-TRANSITORY COMPUTER READABLE MEDIUM FOR RECOGNIZING AND CORRECTING CHARACTERS IN FORMS

(71) Applicant: FUJIFILM Business Innovation Corp., Tokyo (JP)

(72) Inventor: Hiroshi Todoroki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 505 days.

(21) Appl. No.: 17/325,894

(22) Filed: May 20, 2021

(65) Prior Publication Data

US 2022/0180121 A1 Jun. 9, 2022

(30) Foreign Application Priority Data

Dec. 9, 2020 (JP) .................................. 2020-204395

(51) Int. Cl.
*G06V 30/26* (2022.01)
*G06V 30/12* (2022.01)
*G06V 30/19* (2022.01)

(52) U.S. Cl.
CPC ............ *G06V 30/26* (2022.01); *G06V 30/127* (2022.01); *G06V 30/19* (2022.01)

(58) Field of Classification Search
CPC ....... G06V 30/26; G06V 30/127; G06V 30/19
See application file for complete search history.

(56) References Cited

U.S. PATENT DOCUMENTS

2008/0063277 A1* 3/2008 Vincent ................. G06F 18/254
382/182
2020/0089944 A1 3/2020 Sasagawa

FOREIGN PATENT DOCUMENTS

| JP | 4299977 B2 | 7/2009 |
| JP | 2011-060185 A | 3/2011 |
| JP | 2020-046734 A | 3/2020 |

OTHER PUBLICATIONS

"C++ Reading characters from file, count each one and sort" (retrieved at https://stackoverflow.com/questions/56637097/c-reading-characters-from-file-count-each-one-and-sort, various comments published through Jun. 2019).*
"How do you read two files in the same program in C++?" (retrieved at https://www.physicsforums.com/threads/how-do-you-read-two-files-in-the-same-program-in-c.968997/#:~:text=Can%20you%20read%20two%20files,read%20from%20both%20files%20alternately, various comments published through Mar. 2019).*

* cited by examiner

*Primary Examiner* — Casey L Kretzer
(74) *Attorney, Agent, or Firm* — Oliff PLC

(57) ABSTRACT

An information processing apparatus includes a processor configured to perform processing for displaying character information recognized by reading plural forms, in a descending or ascending order of the number of pieces of character information recognized as being identical.

4 Claims, 11 Drawing Sheets

FIG. 6

READING RESULT CHECK CORRECTION

| FORM VIEW | LIST VIEW | |
|---|---|---|
| UNCHECKED ITEMS: 200 | | ALL ITEMS: 300 |

● FILTERING FOR UNCHECKED ITEMS
○ FILTERING FOR ALL ITEMS

| CHECK BOX | |
|---|---|
| CHECKED | 30 RESULTS |
| UNCHECKED | 20 RESULTS |

| ONE-DIGIT NUMBER | |
|---|---|
| 2 | 150 RESULTS |
| 0 | 21 RESULTS |
| 1 | 0 RESULTS |
| 3 | 0 RESULTS |
| 4 | 0 RESULTS |
| 5 | 0 RESULTS |
| 6 | 0 RESULTS |
| 7 | 0 RESULTS |
| 8 | 0 RESULTS |
| 9 | 0 RESULTS |

OTHERS

CHARACTER SIZE: SMALL / MEDIUM / LARGE

| RECORD 1 ID ▼ | ITEM NAME ▼ | SCAN IMAGE | CHECK RESULT | CERTAINTY ▼ | CHECK ☐ |
|---|---|---|---|---|---|
| 0005202-001 | YEAR | 2 | 2 | HIGH | ✓ |
| 0005202-002 | YEAR | 2 | 2 | HIGH | ✓ |
| 0005202-003 | YEAR | 2 | 2 | HIGH | ✓ |
| 0005202-004 | YEAR | 2 | 2 | HIGH | ✓ |
| 0005202-005 | YEAR | 2 | 2 | HIGH | ✓ |
| 0005202-006 | YEAR | 2 | 2 | HIGH | ☐ |
| 0005202-007 | YEAR | 2 | 2 | HIGH | ☐ |
| 0005202-008 | YEAR | 2 | 2 | LOW | ☐ |
| 0005202-009 | YEAR | 2 | 2 | HIGH | ☐ |

CHECKED: 5 RESULTS   UNCHECKED: 145 RESULTS   1 – 100 / 150 RESULTS

TEMPORARILY SAVE   CANCEL   OK

FIG. 7

READING RESULT CHECK CORRECTION

FORM VIEW | LIST VIEW

UNCHECKED ITEMS: 200    ALL ITEMS: 300    CHARACTER SIZE: [SMALL] MEDIUM LARGE

○ FILTERING FOR UNCHECKED ITEMS
● FILTERING FOR ALL ITEMS

CHECK BOX
| | |
|---|---|
| CHECKED | 30 RESULTS |
| UNCHECKED | 20 RESULTS |

ONE-DIGIT NUMBER
| | |
|---|---|
| 2 | 150 RESULTS |
| 0 | 21 RESULTS |
| 1 | 0 RESULTS |
| 3 | 0 RESULTS |
| 4 | 0 RESULTS |
| 5 | 0 RESULTS |
| 6 | 0 RESULTS |
| 7 | 0 RESULTS |
| 8 | 0 RESULTS |
| 9 | 0 RESULTS |

OTHERS

| RECORD 1 ID ▼ | ITEM NAME ▼ | SCAN IMAGE | CHECK RESULT | CERTAINTY ▼ | CHECK |
|---|---|---|---|---|---|
| xxxxxxxx1 | CHECK MARK | ☐ | ☐ NONE | MEDIUM | ☐ |
| xxxxxxxx1 | CHECK MARK | ☐ | ☐ COMPANY WORKER | LOW | ☐ |
| xxxxxxxx1 | CHECK MARK | ☐ | ☐ SELF-EMPLOYED | MEDIUM | ☐ |
| xxxxxxxx1 | CHECK MARK | ☐ | ☐ OTHER | MEDIUM | ☐ |
| xxxxxxxx2 | CHECK MARK | ☐ | ☐ NONE | MEDIUM | ☐ |
| xxxxxxxx2 | CHECK MARK | ☐ | ☐ COMPANY WORKER | HIGH | ✓ |
| xxxxxxxx2 | CHECK MARK | ☐ | ☐ SELF-EMPLOYED | MEDIUM | ☐ |
| xxxxxxxx2 | CHECK MARK | ☐ | ☐ OTHER | HIGH | ✓ |
| xxxxxxxx3 | CHECK MARK | ☐ | ☐ NONE | MEDIUM | ☐ |

CHECKED: 2 RESULTS    UNCHECKED: 18 RESULTS    1-9/20 RESULTS

TEMPORARILY SAVE    CANCEL    OK

FIG. 8

READING RESULT CHECK CORRECTION

FORM VIEW | LIST VIEW

UNCHECKED ITEMS: 124   ALL ITEMS: 165

○ FILTERING FOR UNCHECKED ITEMS
● FILTERING FOR ALL ITEMS

| | |
|---|---|
| 7 | 0 RESULTS |
| 8 | 0 RESULTS |
| 9 | 0 RESULTS |
| BLANK OR UNKNOWN | 10 RESULTS |
| OTHERS | |
| ALL TEXTS | 120 RESULTS |
| FUJI HANAKO | 10 RESULTS |
| KO | 10 RESULTS |
| 0123-45-678 | 5 RESULTS |
| 2019 | 5 RESULTS |
| 2019/4/22 | 5 RESULTS |
| APRIL 22, 2019 | 5 RESULTS |
| 500000 YEN | 5 RESULTS |
| 80,000 YEN | 5 RESULTS |
| s59.ID.20 | 5 RESULTS |
| ABCDEFG... | 5 RESULTS |

CHARACTER SIZE: SMALL | MEDIUM | LARGE

| RECORD 1 ID ▼ | ITEM NAME ▼ | SCAN IMAGE | CHECK RESULT | CERTAINTY ▼ | CHECK ☐ |
|---|---|---|---|---|---|
| xxxxxxxx1 | NAME | FUJI HANAk0 | FUJI HANAKO | MEDIUM | ☐ |
| xxxxxxxx1 | NAME | FUJI HANAk0 | FUJI HANAKO | LOW | ☐ |
| xxxxxxxx1 | NAME | FUJI HANAk0 | FUJI HANAKO | HIGH | ✓ |
| xxxxxxxx1 | NAME | FUJI HANAk0 | FUJI HANAKO | HIGH | ✓ |
| xxxxxxxx2 | NAME | FUJI HANAk0 | FUJI HANAKO | HIGH | ✓ |
| xxxxxxxx2 | NAME | FUJI HANAk0 | FUJI HANAKO | LOW | ☐ |
| xxxxxxxx2 | NAME | FUJI HANAk0 | FUJI HANAKO | LOW | ☐ |
| xxxxxxxx3 | NAME | FUJI HANAk0 | FUJI HANAKO | MEDIUM | ☐ |

CHECKED: 4/10 RESULTS   1–10/10 RESULTS

TEMPORARILY SAVE   CANCEL   OK

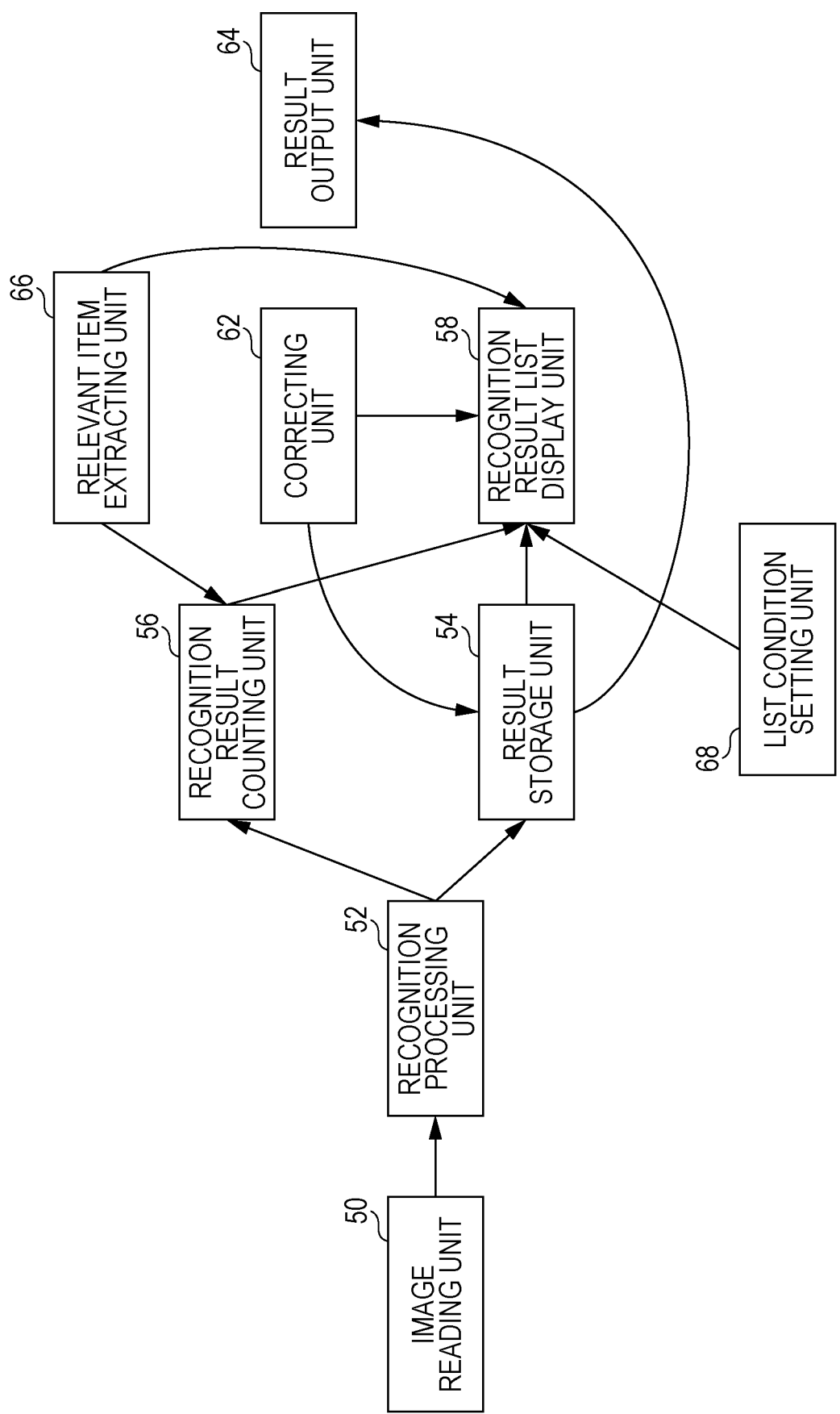

FIG. 10

READING RESULT CHECK CORRECTION

TEXT FILTER

| WISCONSIN | 230 RESULTS |
| MINNESOTA | 200 RESULTS |
| IOWA | 180 RESULTS |
| ILLINOIS | 100 RESULTS |
| MINNESATA | 3 RESULTS |
| LOWA | 2 RESULTS |

| RECORD ID | ITEM NAME | SCAN IMAGE | RECOGNITION RESULT | CHECK |
|---|---|---|---|---|
| 005202-001 | STATE | MINNES0TA | MINNESOTA | ☐ |
| 005202-010 | STATE | MINNES0TA | MINNESOTA | ☐ |
| 005202-011 | STATE | MINNES0TA | MINNESOTA | ☐ |
| 005202-012 | STATE | MINNES0TA | MINNESOTA | |

"MINNESOTA" (3 RESULTS) MAY CORRECTLY BE THE ABOVE. PLEASE CHECK.

| RECORD ID | ITEM NAME | SCAN IMAGE | RECOGNITION RESULT | CHECK |
|---|---|---|---|---|
| 005202-002 | STATE | MINNESOTA | MINNESOTA | ☐ |
| 005202-003 | STATE | MINNESOTA | MINNESOTA | ☐ |
| 005202-004 | STATE | MINNESOTA | MINNESOTA | |

CHECK TOGETHER

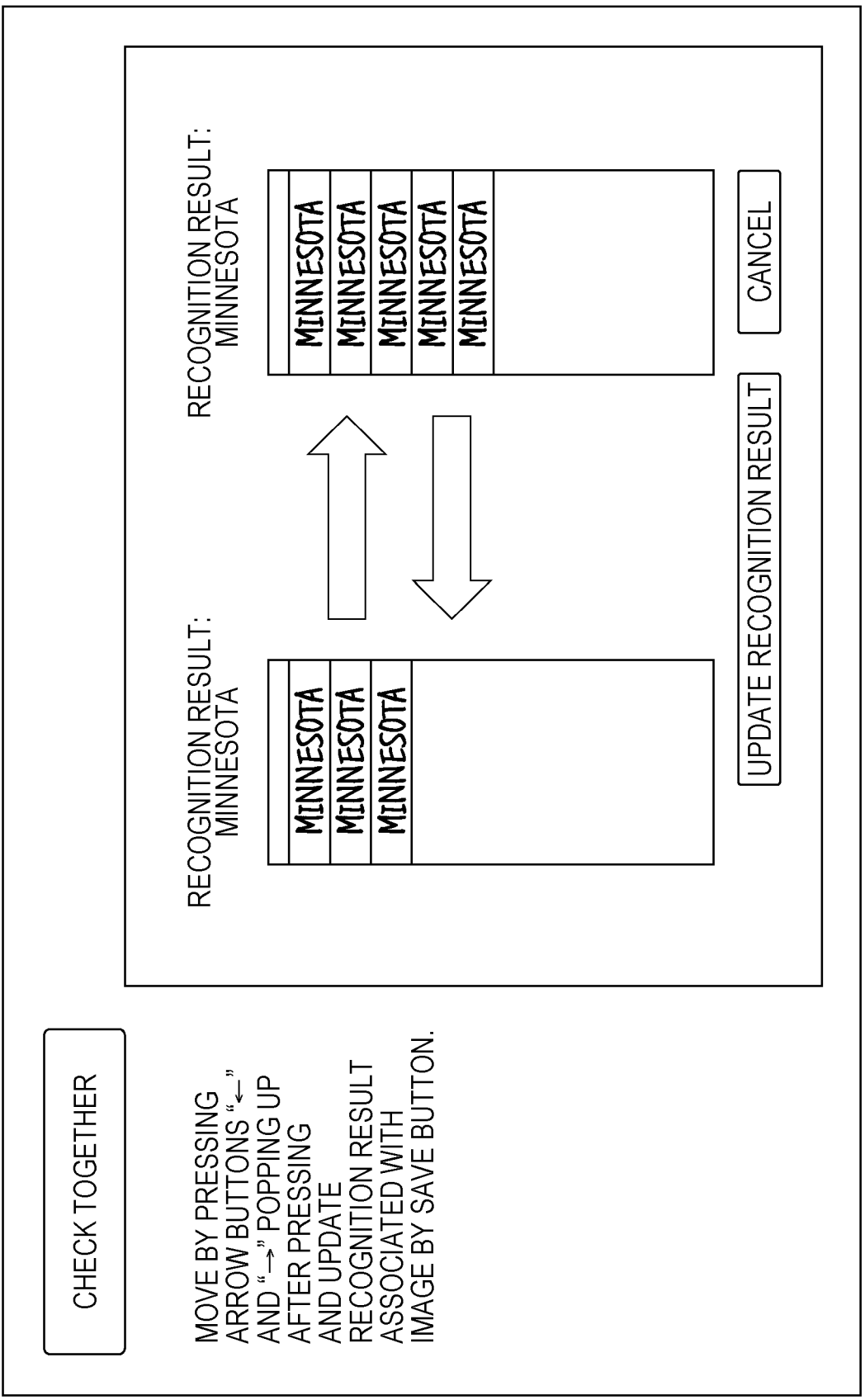

INFORMATION PROCESSING APPARATUS, INFORMATION PROCESSING SYSTEM, AND NON-TRANSITORY COMPUTER READABLE MEDIUM FOR RECOGNIZING AND CORRECTING CHARACTERS IN FORMS

CROSS-REFERENCE TO RELATED APPLICATIONS

This application is based on and claims priority under 35 USC 119 from Japanese Patent Application No. 2020-204395 filed Dec. 9, 2020.

BACKGROUND

(i) Technical Field

The present disclosure relates to an information processing apparatus, an information processing system, and a non-transitory computer readable medium.

(ii) Related Art

Japanese Patent No. 4299977 proposes a recognition result correction device in a character recognizing device for improving correction work efficiency in a case where a large number of forms are input. Specifically, the recognition result correction device receives plural forms each including at least one recognition item as image data. The recognition result correction device recognizes characters in each recognition item in the input form images and causes recognition results of the characters included in the recognition items and information on certainty to be stored, for each form, in a result storage unit in association with these recognition items. The recognition result correction device calculates, as a representative value of each recognition item in each form, at least one of a minimum value and an average value of the information on certainty of the characters stored in the result storage unit and decides an order of correction of forms by sorting the representative values of the recognition items while regarding a priority order of correction of recognition results of the recognition items in each form as a priority order of a sort key.

Japanese Unexamined Patent Application Publication No. 2020-046734 proposes an information processing apparatus that lessens operator's trouble as compared with a case where the operator searches for all correction parts of recognition results of information written into an entry region. Specifically, the information processing apparatus receives an extraction region image showing an extraction region including an entry region in which information is handwritten and displays other extraction region images similar to the extraction region image in a case where an instruction to correct a recognition result of the information written in the entry region shown in the extraction region image is given.

Japanese Unexamined Patent Application Publication No. 2011-060185 proposes a data entry system for efficiently carrying out work of entering data while viewing an image of a form. This data entry system includes a positioning condition storage unit in which conditions for rearranging plural character entry boxes are stored, a cutting-out unit that cuts out character entry fields corresponding to the plural character entry boxes from an image, a rearranging unit that changes an order defined in definition information in accordance with conditions, and a display control unit that causes the plural character entry boxes arranged in the changed order and a cutout image of a character entry field corresponding to a character entry box in which characters are to be input among the plural character entry boxes to be displayed on a screen at an almost same time.

SUMMARY

By displaying character information for characters recognized as being identical by reading plural forms, character information can be collectively checked. However, there is a possibility that a character that is actually different from identical characters is displayed together with the identical characters due to erroneous reading. In a case where a character that is actually different from identical characters is also displayed, it is hard to specify a character to be checked since the identical characters and the different character are hard to distinguish. For example, in a case where a character "1" recognized as a result of reading is to be checked, it is hard to specify the character "1" to be checked if "1", "2", and "3", which are different characters, are displayed together.

Aspects of non-limiting embodiments of the present disclosure relate to an information processing apparatus, an information processing system, and a non-transitory computer readable medium that enable a user to easily specify a character to be checked among recognized characters as compared with a case where character information recognized as being identical by reading plural forms is displayed irrespective of the number of results of character recognition.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to perform processing for displaying character information recognized by reading plural forms, in a descending or ascending order of the number of pieces of character information recognized as being identical.

BRIEF DESCRIPTION OF THE DRAWINGS

An exemplary embodiment of the present disclosure will be described in detail based on the following figures, wherein:

FIG. 6 illustrates an example of a screen for checking and correcting reading results of a one-digit number;

FIG. 7 illustrates an example in which "LIST VIEW" has been selected and "UNCHECKED" of a type of character information "CHECKBOX" has been selected;

FIG. 8 illustrates an example in which "LIST VIEW" has been selected and "FUJI HANAKO" of a type of character information "OTHERS" has been selected;

FIG. 9 is a functional block diagram illustrating a modification of the functional configuration of the units of the form system according to the present exemplary embodiment;

FIG. 10 illustrates a specific example of a screen displayed in a case where a relevant item is extracted and presented in the form system according to the present exemplary embodiment; and FIG. 11 illustrates an example of a screen for checking items that are relevant to each other together.

DETAILED DESCRIPTION

Figure 1:
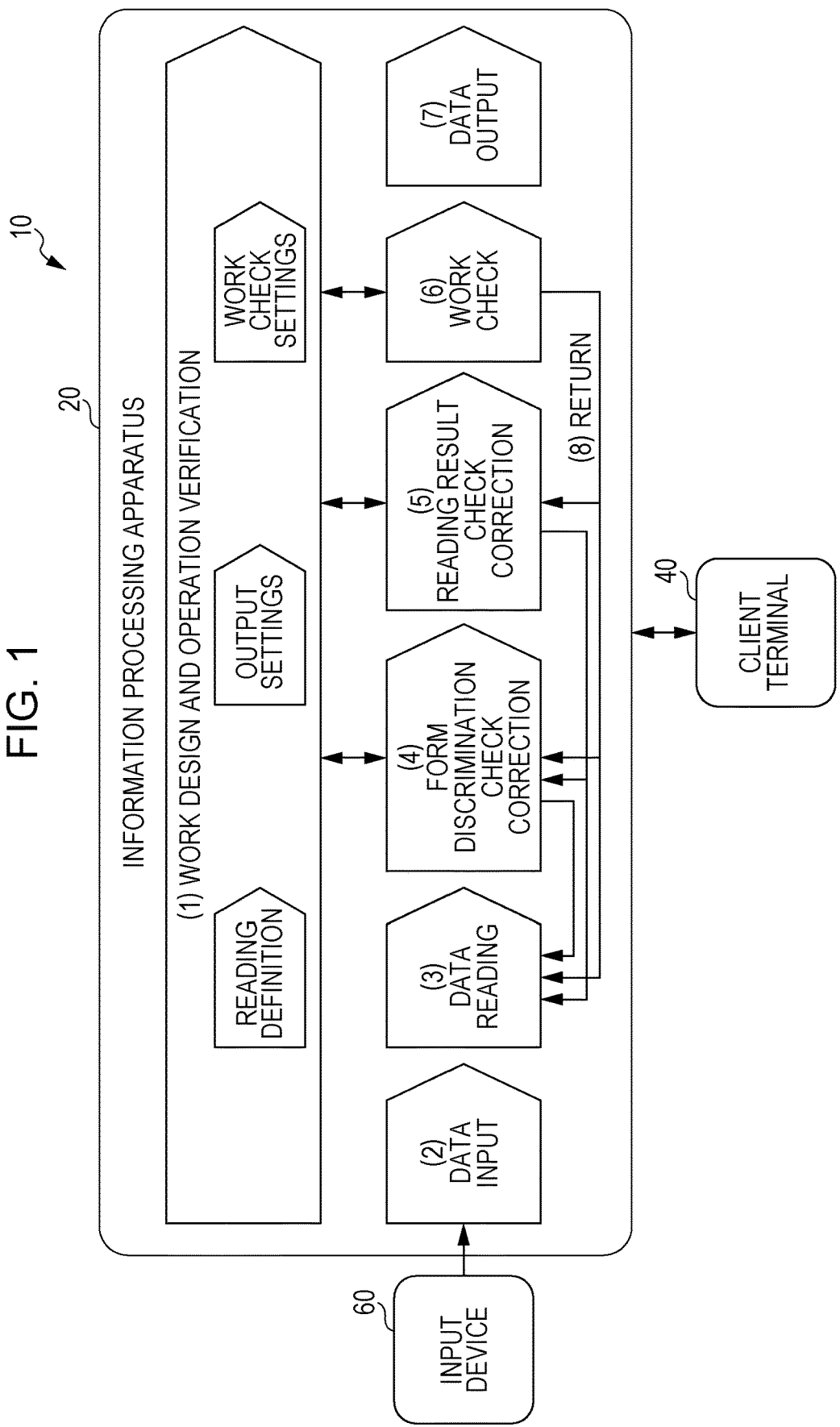
FIG. 1 illustrates an outline configuration of a form system according to the present exemplary embodiment.

An exemplary embodiment of the present disclosure is described in detail below with reference to the drawings. In the present exemplary embodiment, a form system is applied as an example of an information processing system. FIG. 1 illustrates an outline configuration of a form system 10 according to the present exemplary embodiment.

As illustrated in FIG. 1, the form system 10 includes an information processing apparatus 20, a client terminal 40, and an input device 60, which are connected to a communication line such as a network (not illustrated) and can communicate with one another over the communication line. This communication line is, for example, the Internet, a local rea network (LAN), or a wide area network (WAN).

The information processing apparatus 20 performs Optical Character Recognition (OCR) processing on image data of plural documents including a form input through the input device 60 and manages a flow of a series of processing for outputting a result of the OCR processing to a predetermined destination. Specific configuration and operation of the information processing apparatus 20 will be described later.

The client terminal 40 transmits various instructions concerning OCR processing to the information processing apparatus 20. Examples of the various instructions include an instruction to start reading of information of image data and an instruction to display a result of reading information of image data. The client terminal 40 displays various kinds of information such as a result of OCR processing performed by the information processing apparatus 20 in response to received various instructions and a notification concerning the OCR processing. The client terminal 40 is, for example, a general-purpose computer device such as a server computer or a personal computer (PC). Although only a single client terminal 40 is illustrated in FIG. 1, the number of client terminals 40 is not limited to this. Plural client terminals 40 may be prepared, and, for example, these client terminals 40 may be used for different kinds of processing.

The input device 60 supplies image data to be subjected to OCR processing to the information processing apparatus 20. The input device 60 is, for example, a server computer, a general-purpose computer device such as a PC, or an image forming apparatus having functions such as a scan function, a printer function, and a FAX function. Note that image data may be supplied to the information processing apparatus 20 not only from the input device 60, but also from the client terminal 40.

Next, an outline of the form system 10 is described.

The form system 10 is a system in which the information processing apparatus 20 performs OCR processing on image data input through the input device 60 and outputs a result of the OCR processing to a predetermined destination.

In the OCR processing, the information processing apparatus 20 manages various kinds of processing, specifically, (1) work design and operation verification, (2) data input, (3) data reading, (4) form discrimination check correction, (5) reading result check correction, (6) work check, (7) data output, and (8) return. In the present exemplary embodiment, the OCR processing includes not only processing for reading characters, symbols, and the like from image data, but also post-processing such as correction of characters.

As an example of management of the various kinds of processing, (1) work design and operation verification, (2) data input, (3) data reading, (6) work check, and (7) data output are automatically executed by the information processing apparatus 20. Furthermore, as an example of management of the various kinds of processing, (4) form discrimination check correction and (5) reading result check correction are received by user's entry through the client terminal 40. Furthermore, as an example of management of the various kinds of processing, (8) return is automatically executed by the information processing apparatus 20 in some cases and is received by user's entry through the client terminal 40 in other cases.

In (1) work design and operation verification, a job rule including reading definition settings, output settings, and work check settings is created. In the reading definition settings, for example, a reading range, which is a range of reading of information of image data in "(3) data reading", is set. More specifically, for example, definition such that an item value, which is a value, is read from a portion on the right of an item extracted as a key can be set. In the output settings, for example, a file format and a destination of output data output in "(7) data output" are set. In work check settings, for example, a required entry item in a form to be detected in "(6) work check" or a format such as the number of characters that can be input is set.

In (2) data input, entry of image data from the input device 60 is received. The received image data is registered as a job, which is a unit of execution in "(3) data reading".

In (3) data reading, information is read from image data in a job to be executed by using a job rule for the job selected from among job rules created in "(1) work design and operation verification". For example, in this processing, discrimination (hereinafter referred to as "form discrimination") of a form included in image data in the job and reading of characters and symbols within a reading range are performed.

In (4) form discrimination check correction, image data in a job is divided into records indicative of forms included in the job on the basis of a result of form discrimination performed in "(3) data reading". Then, in this processing, the divided records are displayed, and user's check and correction of the form discrimination are received.

In (5) reading result check correction, results of reading of characters and symbols within a reading range performed in "(3) data reading" are displayed, and user's check and correction of the reading results are received.

In (6) work check, an error in preceding processing is detected based on work check settings included in a job rule for the job selected from among the job rules created in "(1) work design and operation verification". A result of the detection may be presented to the user.

In (7) data output, output data is created based on output settings included in a job rule for the job selected from among the job rules created in "(1) work design and operation verification", and the created output data is output to a predetermined destination.

In (8) return, the OCR processing returns from executed processing to processing one stage before the executed processing or processing two or more stages before the executed processing. For example, the user gives an instruction for the return on the client terminal 40 during execution of processing such as "(4) form discrimination check correction" or "(5) reading result check correction". Alternatively, for example, an instruction for the return is given from the client terminal 40 of an administrator in accordance with a result of check performed by the administrator between "(6) work check" and "(7) data output".

In the OCR processing, "(1) work design and operation verification" is executed before "(3) data reading" and subsequent processing are performed, that is, before operation of the form system 10. Furthermore, "(1) work design and operation verification" may be executed during operation of the form system 10 in which "(3) data reading" or subsequent processing is being performed. For example, the job rules created in "(1) work design and operation verification" before operation of the form system 10 can be modified as appropriate in accordance with a result of "(5) reading result check correction" performed during operation of the form system 10.

Figure 2:
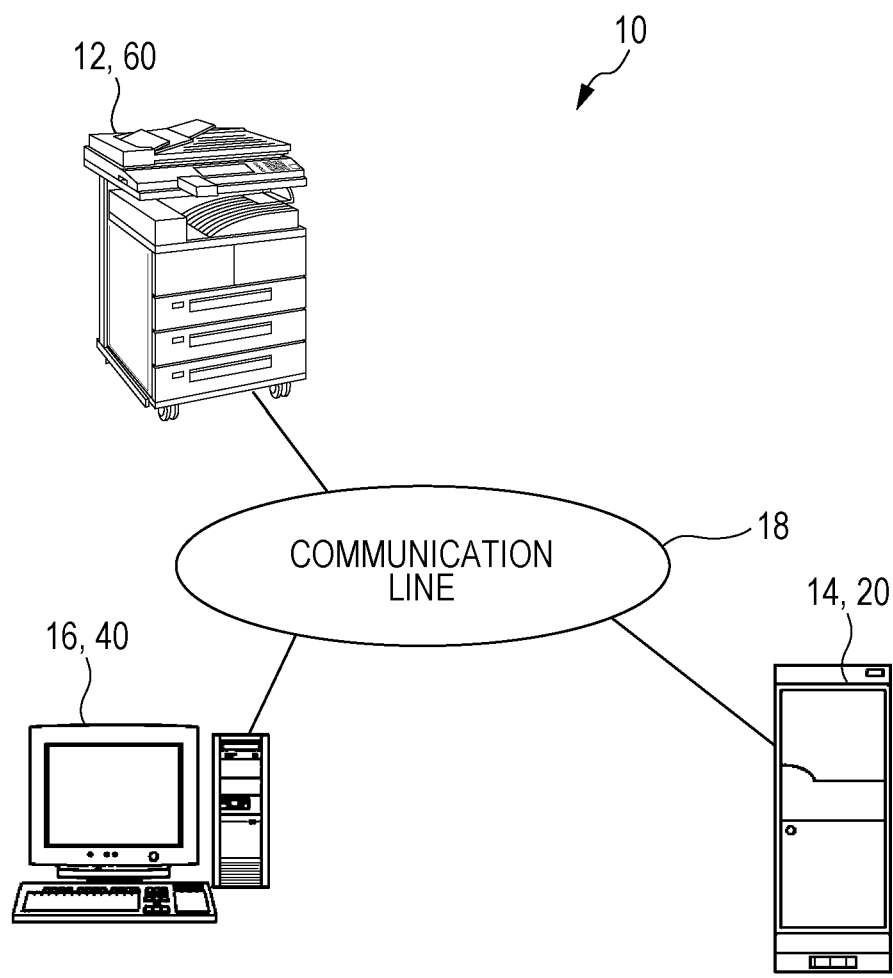
FIG. 2 is a diagram illustrating a specific example of a configuration of the form system according to the present exemplary embodiment.

Next, a specific example of a configuration of the form system 10 according to the present exemplary embodiment is described. FIG. 2 is a diagram illustrating a specific example of a configuration of the form system 10 according to the present exemplary embodiment.

FIG. 2 illustrates an example of the form system 10 in which an image forming apparatus 12 is applied as the input device 60, a cloud server 14 is applied as an example of the information processing apparatus 20, and a PC 16 is applied as an example of the client terminal 40.

In the form system 10, the image forming apparatus 12, the cloud server 14, and the PC 16 are connected to one another over a communication line 18. The image forming apparatus 12, the cloud server 14, and the PC 16 are each configured to be capable of transmitting various data to and from one another over the communication line 18.

Figure 3:
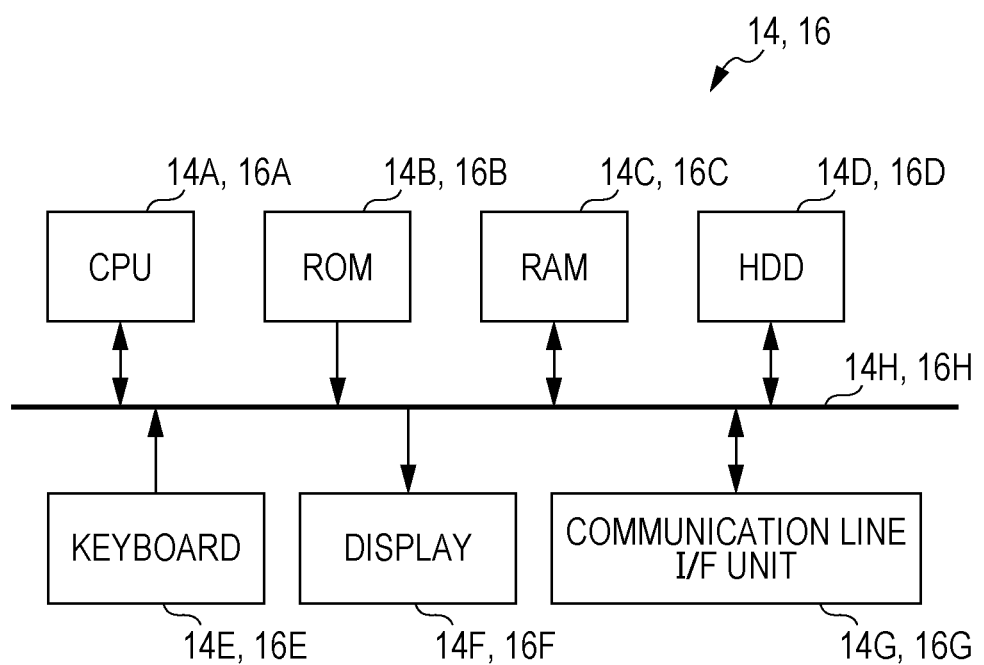
FIG. 3 is a block diagram illustrating a configuration of a substantial part of an electric system of a cloud server and a PC according to the present exemplary embodiment.

Next, a configuration of a substantial part of an electric system of the cloud server 14 and the PC 16 according to the present exemplary embodiment is described. FIG. 3 is a block diagram illustrating a configuration of a substantial part of an electric system of the cloud server 14 and the PC 16 according to the present exemplary embodiment. Since the cloud server 14 and the PC 16 basically have a configuration of a general computer, the cloud server 14 is described as a representative, and description of the PC 16 is omitted.

As illustrated in FIG. 3, the cloud server 14 according to the present exemplary embodiment includes a CPU 14A, a ROM 14B, a RAM 14C, an HDD 14D, a keyboard 14E, a display 14F, and a communication line interface (I/F) unit 14G. The CPU 14A controls overall operation of the cloud server 14. The ROM 14B stores therein various control programs and various parameters in advance. The RAM 14C is used, for example, as a work area during execution of various programs by the CPU 14A. The HDD 14D stores therein various data, application programs, and others. The keyboard 14E is used to enter various kinds of information. The display 14F is used to display various kinds of information. The communication line interface unit 14G is connected to the communication line 18 and transmits and receives various data to and from another device connected to the communication line 18. The above members of the cloud server 14 are electrically connected to one another by a system bus 14H. Although an example in which the cloud server 14 includes the HDD 14D is described in the present exemplary embodiment, this is not restrictive, and the cloud server 14 may include a different non-volatile storage unit such as a flash memory.

In the cloud server 14 according to the present exemplary embodiment having the above configuration, the CPU 14A executes access to the ROM 14B, the RAM 14C, and the HDD 14D, acquisition of various data through the keyboard 14E, and display of various kinds of information on the display 14F. Furthermore, in the cloud server 14, the CPU 14A controls transmission and reception of communication data through the communication line interface unit 14G.

In the present exemplary embodiment, the CPU 14A performs processing for displaying pieces of character information recognized by reading plural forms in a descending or ascending order of the number of pieces of character information recognized as being identical. Specifically, the CPU 14A performs processing for rearranging the pieces of character information recognized by reading plural forms in a descending or ascending order of the number of pieces of character information recognized as being identical and displaying the rearranged pieces of character information on the PC 16. The present exemplary embodiment discusses an example in which the pieces of character information are displayed in a descending order of the number of pieces of character information recognized as being identical.

Figure 4:
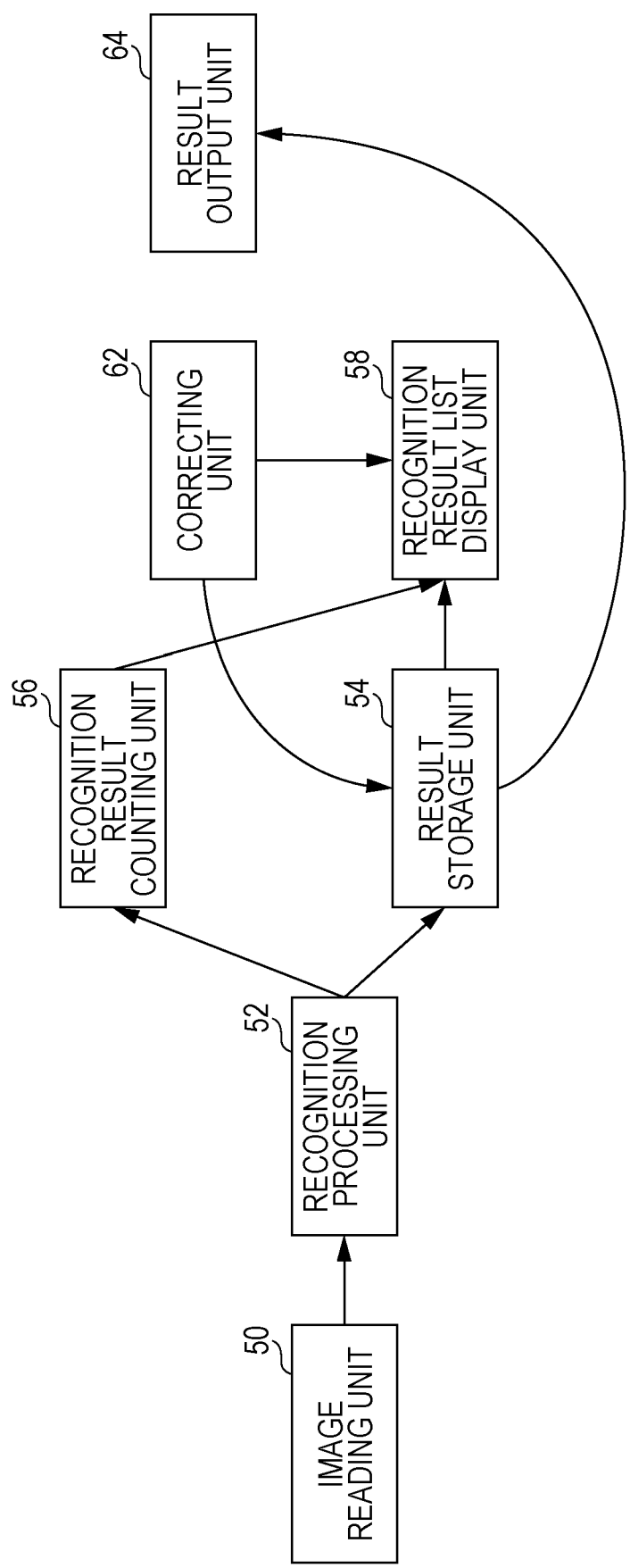
FIG. 4 is a functional block diagram illustrating a functional configuration of units of the form system according to the present exemplary embodiment.

Next, a functional configuration of the form system 10 according to the present exemplary embodiment configured as above is described. FIG. 4 is a functional block diagram illustrating a functional configuration of the units of the form system 10 according to the present exemplary embodiment.

The form system 10 has functions of an image reading unit 50, a recognition processing unit 52, a result storage unit 54, a recognition result counting unit 56, a recognition result list display unit 58, a correcting unit 62, and a result output unit 64. The functions are realized by execution of programs. In the present exemplary embodiment, it is assumed that the image reading unit 50 is a function of the image forming apparatus 12, and the recognition processing unit 52, the result storage unit 54, the recognition result counting unit 56, the recognition result list display unit 58, the correcting unit 62, and the result output unit 64 are functions of the cloud server 14. Note that the recognition processing unit 52, the result storage unit 54, the recognition result counting unit 56, the recognition result list display unit 58, the correcting unit 62, and the result output unit 64 may be functions divided among plural servers, not functions of the single cloud server 14.

The image reading unit 50 generates image data of an image obtained by computerizing an input document. A non-standard form may be automatically recognized. For example, the image reading unit 50 generates image data of an image obtained by reading a form by the image forming apparatus 12.

The recognition processing unit 52 recognizes characters by OCR processing from image data generated by reading an image by the image reading unit 50 and reads written contents.

The result storage unit 54 stores image data of a form and results of recognition of characters by OCR processing in association with each other. For example, the result storage unit 54 stores recognition results such as character information and a degree of certainty of character recognition in the HDD 14D in association with image data of a character image.

The recognition result counting unit 56 counts results of recognition of characters recognized for plural forms. For example, the recognition result counting unit 56 counts the number of results of recognition for each character information.

The recognition result list display unit 58 displays, for example, character images, character information, and degrees of certainty recognized for plural forms as a list. Furthermore, the recognition result list display unit 58 also displays results of counting of the recognition results so that the character information is displayed in a descending order of the number of results of counting. Furthermore, the recognition result list display unit 58 displays the list for each item so that different ones can be easily extracted and selected. Whether or not the character images and character information are correct is determined by viewing this. For example, the character images and character information are displayed in a checkable manner so that wrong ones can be easily found from among character images and character information displayed in the same column.

The correcting unit 62 receives a correct result and updates information stored in the result storage unit 54 in a case where a result of character recognition is wrong. After updating a check status, only results that have not been checked yet can be sorted again.

The result output unit 64 outputs a result of the series of processing including a result of correction by the correcting unit 62. Output data includes, for example, an input form such as Comma Separated Value (CSV) to a mission-critical system.

Figure 5:
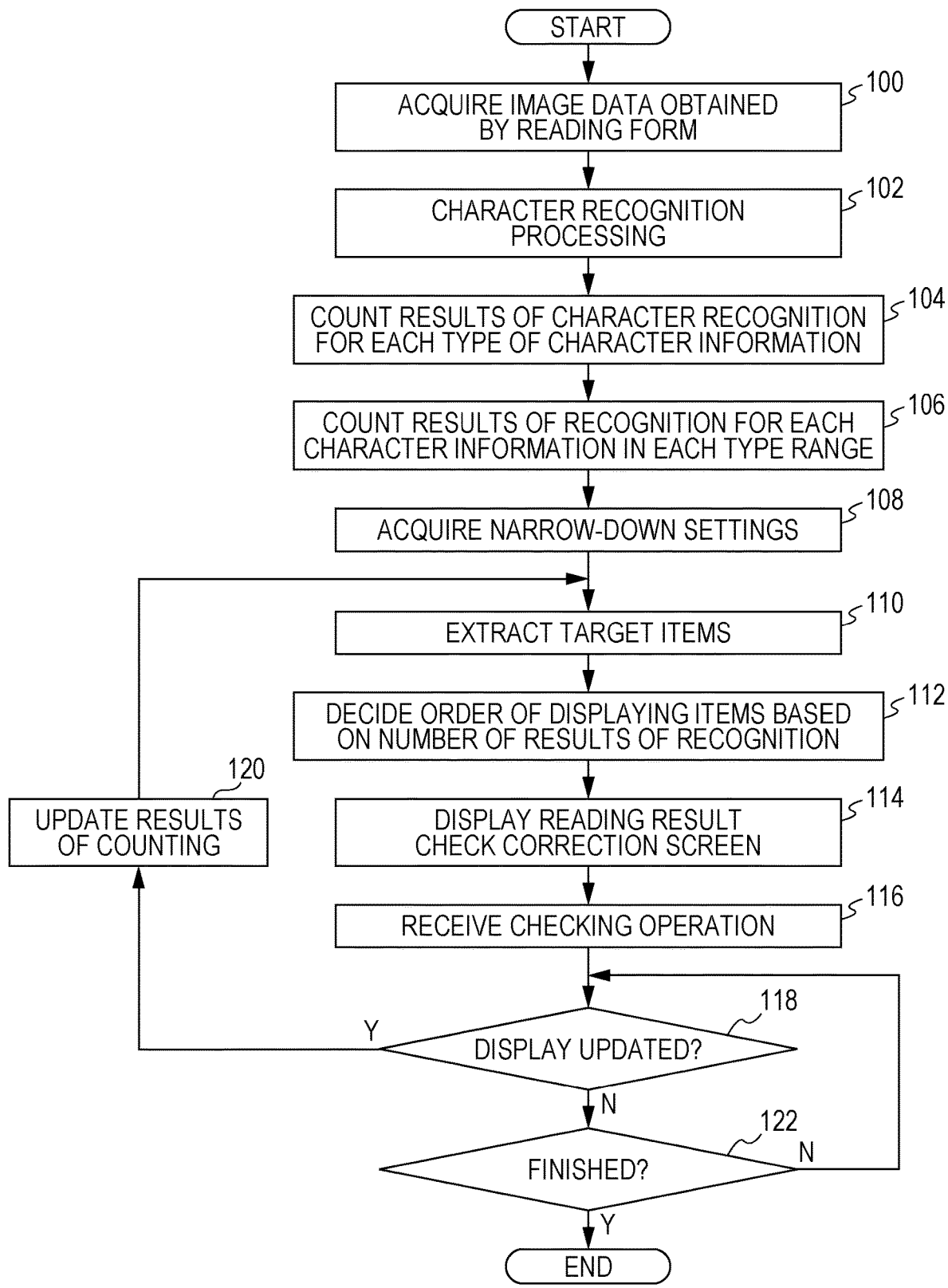
FIG. 5 is a flowchart illustrating an example of a flow of processing performed by the cloud server in the form system according to the present exemplary embodiment.

Next, specific processing performed by the form system 10 according to the present exemplary embodiment is described. FIG. 5 is a flowchart illustrating an example of a flow of processing performed by the cloud server 14 in the form system 10 according to the present exemplary embodiment. The processing in FIG. 5 starts, for example, in a case where an instruction to start reading of information of image data is given by the PC 16.

In step 100, the CPU 14A acquires image data obtained by reading a form and proceeds to step 102. Specifically, the CPU 14A acquires image data generated by reading a form by the image reading unit 50. For example, the CPU 14A acquires image data generated by reading each page of a form.

In step 102, the CPU 14A performs character recognition processing and proceeds to step 104. Specifically, the recognition processing unit 52 recognizes characters by OCR processing from image data generated by reading an image by the image reading unit 50 and converts a handwritten character image or a printed character image into character information by reading written contents.

In step 104, the CPU 14A counts results of character recognition for each type of character information and proceeds to step 106. Specifically, the recognition result counting unit 56 counts results of recognition of characters recognized for plural forms. More specifically, the recognition result counting unit 56 counts the total number of character images for each type of character information such as a check box, a one-character number, a one-character alphabet, or a freely-written character information including Japanese.

In step 106, the CPU 14A counts results of recognition for each character information in each type range and proceeds to step 108. Specifically, the recognition result counting unit 56 calculates the total number of character images for each character information.

In step 108, the CPU 14A acquires narrow-down settings and proceeds to step 110. For example, the CPU 14A acquires narrow-down settings using an attribute that does not depend on the recognition results such as a processing date designated by a user's operation.

In step 110, the CPU 14A extracts target items and proceeds to step 112. The target items are extracted by filtering the results of the counting in accordance with user's selection. For example, items concerning a today's job are extracted by filtering the results of the counting, for example, by using time and date.

In step 112, the CPU 14A decides an order of displaying the items based on the number of results of recognition and proceeds to step 114. In the present exemplary embodiment, the recognition result list display unit 58 rearranges freely-written character strings including Japanese in data obtained after the filtering in a descending order of the total number of results of recognition.

In step 114, the CPU 14A displays a predetermined reading result check correction screen and proceeds to step 116. Specifically, the recognition result list display unit 58 displays character images, character information, and degrees of certainty obtained as a result of recognition of plural forms as a list on the display 16F of the PC 16 and displays results of counting of recognition results in a descending order of the number of results of counting. Whether or not a character image and character information are correct is judged by viewing this.

In step 116, the CPU 14A receives a checking operation and proceeds to step 118. For example, the recognition result list display unit 58 receives an instruction to select a character to be checked from the PC 16 and displays a character image of the selected character and character information that is a result of recognition of the character, and the correcting unit 62 receives a result of checking as to whether or not the result of character recognition is correct.

In step 118, the CPU 14A determines whether or not to update display. For example, it is determined whether or not an operation for updating display has been performed. In a case where a result of the determination is positive, step 120 is performed, whereas in a case where a different operation such as a finishing instruction is performed, the result of the determination is negative, and step 122 is performed.

In step 120, the CPU 14A updates the results of counting, returns to step 110, and repeats the above processing.

In step 122, the CPU 14A determines whether or not the processing is finished. Specifically, it is determined whether or not an operation for finishing the processing has been performed. In a case where a result of the determination is negative, the processing returns to step 118 and the above processing is repeated, whereas in a case where the result of the determination is positive, the series of processing is finished.

A specific example of a screen for checking character recognition results is described below. FIG. 6 illustrates an example of a screen for check and correction of reading results of a one-digit number.

In the example of FIG. 6, "FORM VIEW" and "LIST VIEW" are selectable. FIG. 6 illustrates an example in which the "LIST VIEW" has been selected. The "FORM VIEW" is a display form for displaying results of character recognition by showing read forms, and the "LIST VIEW" is a display form for displaying, as a list, results of character recognition of read forms filtered by using an item selected by a user.

In the example of FIG. 6, the total number of items is 300 and the number of unchecked items is 200, and the unchecked items are displayed by filtering the results of character recognition. Furthermore, the total number of character images is displayed for each type of character information, and the total number is displayed for each character information. In the example of FIG. 6, character information is displayed in a descending order of the total number of results of character recognition of character information. As for a type of character information "ONE-DIGIT NUMBER", the number of results of character recognition of "2" is 150, which is the largest, the number of results of character recognition of "0" is 21, which is the second largest, and the number of results of character recognition of other "ONE-DIGIT NUMBERS" is 0. By thus displaying the character information in a descending order of the total number of results of character recognition of character information, it becomes easy for a user to specify a character to be checked among recognized characters.

In the example of FIG. 6, "2" of "ONE-DIGIT NUMBER" is selected, and a record ID, an item name, a scan image, a check result, a degree of certainty, and checked or unchecked of "2" are displayed. In the example of FIG. 6, a degree of certainty of the second result from the bottom is "LOW", and degrees of certainty of the other results are "HIGH". The screen is updated when the user performs an operation for giving a check mark and operates "TEMPORARILY SAVE".

FIG. 7 illustrates an example in which "LIST VIEW" has been selected and "UNCHECKED" of a type of character information "CHECKBOX" has been selected.

In the example of FIG. 7, the total number of items is 300 and the number of unchecked items is 200, and the unchecked items are displayed by filtering the results of character recognition, as in FIG. 6. Furthermore, the total number of character images is displayed for each type of character information, and the total number is displayed for each character information. In the example of FIG. 7, the character information is displayed in a descending order of the total number of results of character recognition of character information. As for a type of character information "ONE-DIGIT NUMBER", the number of results of character recognition of "2" is 150, which is the largest, the number of results of character recognition of "0" is 21, which is the second largest, and the number of results of character recognition of other "ONE-DIGIT NUMBERS" is 0.

In the example of FIG. 7, "UNCHECKED" of "CHECKBOX" has been selected, a record ID, an item name, a scan image, a check result, a degree of certainty, and checked or unchecked of "UNCHECKED" of "CHECKBOX" are displayed. In the example of FIG. 7, in the "CHECK" field, a check mark is given as for results whose degrees of certainty is "HIGH".

FIG. 8 illustrates an example in which "LIST VIEW" has been selected and "FUJI HANAKO" of a type of character information "OTHERS" has been selected.

In the example of FIG. 8, the total number of items is 165 and the number of unchecked items is 124, and all items are displayed by filtering the results of character recognition. Furthermore, the total number of character images is displayed for each type of character information, and the total number is displayed for each character information. In the example of FIG. 8, the character information is displayed in a descending order of the total number of results of character recognition of character information. As for a type of character information "OTHERS", the number of results of character recognition of "FUJI HANAKO" is 20, which is the largest, the number of results of character recognition of "KO" and the number of results of character recognition of "0123-45-678" are 10, which is the second largest, . . . among 120 results of "ALL TEXTS".

In the example of FIG. 8, "FUJI HANAKO" has been selected, a record ID, an item name, a scan image, a check result, a degree of certainty, and checked or unchecked of "FUJI HANAKO" are displayed. In the example of FIG. 8, in the "CHECK" field, a check mark is given as for results whose degrees of certainty is "HIGH".

As described above, in the present exemplary embodiment, character information is displayed in a descending order of the number of results of reading. As the number of results of reading of a word becomes larger, accuracy of collectively displayed results becomes higher. Therefore, a user can perform collective check of results of reading in a descending order of accuracy. This allows the user to efficiently perform the checking operation.

As illustrated in FIG. 9, the form system 10 may further include, as functions, a list condition setting unit 68 and a relevant item extracting unit 66 in addition to the functional configuration illustrated in FIG. 4. FIG. 9 is a functional block diagram illustrating a modification of the functional configuration of the units of the form system 10 according to the present exemplary embodiment.

In this case, the list condition setting unit 68 designates not only a descending order of the number of results of character recognition of character information, but also a displaying order such as an ascending order of the number of results of character recognition of character information or an order set by an administrator. The order set by an administrator may be, for example, an order of character codes given to characters.

The relevant item extracting unit 66 presents character images and character information as relevant recognition results in accordance with similarity between cutout characters. An item whose cutout image has a predetermined similarity or higher is referred to as a relevant item. For example, an item whose degree of certainty of character recognition as the similarity is equal to or higher than a threshold value is regarded as a relevant item. In a case where a ratio of the total number of results of recognition of a relevant item to the total number of results of recognition of an item to which the relevant item is relevant is a preset one, the relevant item is presented as being highly likely to have been erroneously recognized.

For example, an item listed as the second or subsequent candidate based on measurement of a degree of certainty or an average of degrees of certainty for an image recognition result is regarded as a relevant item. For example, it is assumed that degrees of certainty for a group of images recognized as "MINNESOTA" are as follows: "MINNESOTA": 90%, "MINNESATA": 70%, "MINNESOTO": 65%, "MIMESOTA": 55%. The second candidate is "MINNESATA": 70%, and an image for which "MINNESATA" is the first candidate is set as a relevant item. A group of images for which "MINNESATA" set as a relevant item is the first candidate is presented as having been erroneously recognized although "MINNESOTA" is correct. In a case where a ratio of the total number of results of a relevant item to the total number of results of an item to which the relevant item is relevant is equal to or lower than a preset threshold value (e.g., 5%), the relevant item is presented as being highly likely to have been erroneously recognized. For example, in a case where 300 results are obtained for "MINNESOTA" and 10 results and 5 results are obtained for "MINNESATA" and "MINNESOTO", respectively, which are relevant items, a ratio of the total number of results of each of the relevant items to 300 results is equal to or less than 5%, and therefore "MINNESATA" and "MINNESOTO" are presented as being highly likely to have been erroneously recognized.

FIG. 10 illustrates a specific example of a screen displayed in a case where a relevant item is extracted and presented in the form system 10 according to the present exemplary embodiment.

In the example of FIG. 10, results of recognition are: "WISCONSIN": 230 results, "MINNESOTA": 200 results, "IOWA": 180 results, "ILLINOIS": 100 results, "MINNESATA": 3 results, "LOWA": 2 results, and reading results of "MINNESOTA" are checked and corrected. A record ID, a scan image, and a reading result of an item name "STATE" are displayed. In an upper right stage of FIG. 10, images whose degrees of certainty are equal to or higher than a predetermined threshold value (e.g., 90%) among images recognized as "MINNESOTA" are displayed. In a lower stage of FIG. 10, a relevant item is displayed. In this example, since the total number of results (3 results) obtained for "MINNESATA" to the total number of results obtained for "MINNESOTA" is equal to or less than a preset ratio, "MINNESATA" is displayed as being likely to have been erroneously recognized although "MINNESOTA" is correct.

In the example of FIG. 10, a "CHECK TOGETHER" screen illustrated in FIG. 11 is displayed when "CHECK TOGETHER" is operated. FIG. 11 illustrates an example of a screen for checking items that are relevant to each other together. As illustrated in FIG. 11, when an arrow button is pressed after a target recognition result is pressed, the recognition result is moved from "MINNESATA" to "MINNESOTA" or vice versa. When a save button is pressed, recognition results associated with images are updated.

Although an example in which character information is displayed in a descending order of the number of results of recognition has been described in the above embodiment, this is not restrictive. For example, character information may be displayed in an ascending order of the number of results of recognition. In this case, in a case where a user performs a checking correcting operation in an ascending order of results of recognition, it is possible to remove noise at the start. This makes it possible for the user to easily specify a character to be checked among recognized characters as compared with a case where character information is displayed irrespective of the number of results of character recognition. For example, by checking character information in an ascending order of the number of results of recognition and removing noise at the start such as unifying character information with other character information, the user can easily specify a character to be checked among recognized characters. Whether character information is displayed in a descending order of the number of results of recognition or displayed in an ascending order of the number of results of recognition may be settable in advance. Furthermore, character information may be displayed in an order of character codes allocated in advance to characters.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processing performed by the units of the form system 10 according to the above exemplary embodiment may be performed by software, may be performed by hardware, or may be performed by combination of software and hardware. The processing performed by the units of the form system 10 may be distributed by being recorded as a program in a recording medium.

The present disclosure is not limited to the above and can be modified in various ways without departing from the spirit of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
perform processing for displaying character information recognized by reading a plurality of forms, in a descending or ascending order of the number of pieces of character information recognized as being identical;
perform processing for receiving an instruction to select a character for which a reading result is to be checked and displaying a character image of the selected character and character information that is a result of recognition of the selected character;
display a character image of a relevant character having a predetermined similarity or higher with the selected character and character information that is a result of recognition of the relevant character in addition to the character image of the selected character and the character information that is a result of recognition of the selected character; and
in a case where a ratio of the total number of results of recognition of the relevant character to the total number of results of recognition of the selected character is equal to or less than a predetermined threshold value, display the character image and the character information of the relevant character in a manner unified with a screen for displaying the character image of the selected character and the character information that is a result of recognition of the selected character and thereby present a possibility of erroneous recognition of the relevant character.

2. The information processing apparatus according to claim 1, wherein
the processor is configured to further perform processing for displaying a screen on which the character image and the character information of the selected character and the character image and the character information of the relevant character for which the ratio is equal to or less than the predetermined threshold value are checkable together.

3. An information processing system comprising:
the information processing apparatus according to claim 1; and
a client terminal that includes a display and displays the character information on the display in a descending or ascending order of the number of results of recognition by processing of the information processing apparatus.

4. A non-transitory computer readable medium storing a program causing a computer to execute a process for information processing, the process comprising:
displaying character information recognized by reading a plurality of forms, in a descending or ascending order of the number of pieces of character information recognized as being identical;
performing processing for receiving an instruction to select a character for which a reading result is to be checked and displaying a character image of the selected character and character information that is a result of recognition of the selected character;
displaying a character image of a relevant character having a predetermined similarity or higher with the selected character and character information that is a result of recognition of the relevant character in addition to the character image of the selected character and the character information that is a result of recognition of the selected character; and
in a case where a ratio of the total number of results of recognition of the relevant character to the total number of results of recognition of the selected character is equal to or less than a predetermined threshold value, displaying the character image and the character information of the relevant character in a manner unified with a screen for displaying the character image of the selected character and the character information that is a result of recognition of the selected character and thereby presenting a possibility of erroneous recognition of the relevant character.

* * * * *